(12) United States Patent
Hardt

(10) Patent No.: US 7,783,741 B2
(45) Date of Patent: Aug. 24, 2010

(54) PSEUDONYMOUS EMAIL ADDRESS MANAGER

(76) Inventor: Dick C. Hardt, Suite 603, 55 Water Street, Vancouver, British Columbia (CA) V6B 1A1

(*) Notice: Subject to any disclaimer, the term of this patent is extended or adjusted under 35 U.S.C. 154(b) by 826 days.

(21) Appl. No.: 10/713,100

(22) Filed: Nov. 17, 2003

(65) Prior Publication Data

US 2005/0114453 A1    May 26, 2005

(51) Int. Cl.
*G06F 15/173* (2006.01)
(52) U.S. Cl. .................... 709/224; 709/206; 726/22
(58) Field of Classification Search .......... 709/206, 709/224, 226, 245; 726/22
See application file for complete search history.

(56) References Cited

U.S. PATENT DOCUMENTS

| | | | | |
|---|---|---|---|---|
| 5,930,479 | A * | 7/1999 | Hall | 709/206 |
| 6,266,692 | B1 * | 7/2001 | Greenstein | 709/206 |
| 6,708,205 | B2 * | 3/2004 | Sheldon et al. | 709/206 |
| 7,054,906 | B2 * | 5/2006 | Levosky | 709/206 |
| 7,197,539 | B1 * | 3/2007 | Cooley | 709/206 |
| 7,546,349 | B1 * | 6/2009 | Cooley | 709/224 |
| 2002/0087641 | A1 | 7/2002 | Levosky | |
| 2002/0138581 | A1 | 9/2002 | MacIntosh et al. | |
| 2002/0199095 | A1 * | 12/2002 | Bandini et al. | 713/151 |
| 2003/0225841 | A1 * | 12/2003 | Song et al. | 709/206 |
| 2004/0177110 | A1 * | 9/2004 | Rounthwaite et al. | 709/202 |
| 2005/0210107 | A1 * | 9/2005 | Mora | 709/206 |

FOREIGN PATENT DOCUMENTS

| | | |
|---|---|---|
| CA | 2222480 | 7/1998 |
| CA | 2245293 | 9/1999 |
| EP | 1223527 | 7/2002 |
| EP | 1388986 | 2/2004 |

OTHER PUBLICATIONS

"Spamgourmet: FAQ", by Spamgourmet.com, Web Archive dated Aug. 29, 2003 [http://web.archive.org/web/20030829060941/spamgourmet.com/disposableemail.pl?printpage=faq.htm].*
"Spam-me-not Documentation", by www.zapyon.de/spam-me-not, Web Archive dated Oct. 11, 2003 [http://web.archive.org/web/20031011213249/http://zapyon.de/spam-me-not]].*
Gburzynski, "A Comprehensive Approach to Eliminating Spam", *Proceedings of EUROMEDIA*, Plymouth, UK, Apr. 2003.
Gabber et al., "Curbing June E-Mail via Secure Classification", *FC-98: Proceedings of the Second International Conference on Financial Crypotgraphy*, 1998, pp. 198-213.
"Spoofed/Forged Email", http://www.cert.org/tech_tips/email_spoofing.html, Copyright 2001, 2002 Carnegie Mellon University, pp. 1-5.
Hall, "How to Avoid Unwanted Email", *Communications of the Association for Computing Machinery, Association for Computing Machinery*, vol. 41, No. 3, Mar. 1, 1998, pp. 88-95, XP000767817.

* cited by examiner

*Primary Examiner*—Ramy M Osman

(57) ABSTRACT

A system and method of automated pseudonymous email address creation and management is disclosed herein. The use of the disclosed system provides users the ability to create disposable email addresses, so that if a pseudonymous email address is placed on an unsolicited commercial email distribution list, the unsolicited email message can be prevented from reaching the user.

31 Claims, 8 Drawing Sheets

PSEUDONYMOUS EMAIL ADDRESS MANAGER

FIELD OF THE INVENTION

The present invention relates generally to electronic mail. More particularly, the present invention relates to a method and system for the creation and management of email addresses, particularly to reduce the incidence of unsolicited commercial email.

BACKGROUND OF THE INVENTION

Unsolicited Commercial Email (UCE), also commonly referred to as spam, is widely considered a detriment to productivity, and a potential source of undesired or inappropriate material in office and home environments.

UCE can be severely limited if a user's email address is removed from the lists maintained to transmit UCE. Though there has been a great deal of discussion about legislative remedies forcing UCE transmitters to allow users to get their addresses removed from these lists, legislative actions are inherently restricted to a single jurisdiction and will likely simply move the transmitters out of the legislative jurisdiction. There is a wide appreciation that a technical mechanism to prevent email addresses from being harvested from websites, mailing lists, Usenet newsgroups, and other such public places is required.

One method that senders of UCE use to build their mailing lists is to harvest of email addresses published on websites, and provided to Usenet newsgroups. Email addresses given to mailing lists are commonly available in archives that are placed on websites to allow people to search through previous discussions. Email addresses can be identified on web pages by identification of their common structure. This is typically done by an automated harvesting program designed to scour world wide web pages for email addresses, much as search engines scour the same web pages to build an index. Providing email addresses to outside entities, either via mailing lists or web pages, is essential for conducting business, but also provides the senders of UCE with addresses to which UCE can be sent. Many users try to obfuscate email addresses included in web pages using HTML escape codes, the word "at" instead of the symbol "@" and other similar techniques. UCE list builders have adapted to this obfuscation and harvesting programs now recognise the popular obfuscation methods, defeating the obfuscation.

To combat UCE, many organizations have deployed filters to identify UCE at the recipient mail server. Upon identification as UCE, a message is typically either deleted or identified as UCE to allow the user's mail client to sort the message into an appropriate folder. Unfortunately, because filters are not perfect, users often must review the identified messages to determine if there have been any false-positive results. Additionally, some UCE passes through the filters without being identified, and must be manually deleted by the user.

Known filters typically rely upon an origination address in the message header, names or addresses of the transmitting mail server, real time black hole lists and sophisticated heuristic analysis of the subject line to identify UCE. Senders of UCE attempt to bypass filters by forging headers, using nondescript subject lines and by finding so-called open relay mail servers which do not appear on real time black hole lists.

It is also well understood that many filters increase their false positive rate as the filter is tuned to increase the overall identification rate. Many users consider this highly ineffective in a commercial setting, as any message from a previously unknown source can be a potential business opportunity. As a result, many messages identified as UCE must still be examined if the filter is too aggressive in its structure as it will identify all messages from sites on the list as UCE regardless of their sender or content.

There is a general consensus among those skilled in the art that filtering is inexact and as a result it is possible to bypass filters by changing strategy and message structure.

Filters operate in conjunction with mail servers by scanning the header and body of incoming messages. A conventional mail server receives messages on a predefined port, typically port 25 for simple mail transfer protocol (SMTP) traffic. These messages have both an envelope section and a payload. The envelope of a message indicates the recipient of the message, while the payload has both a message header and body. The message header typically contains information regarding the sender, and some of the routing information associated with the message. The message header includes a destination address, that need not be the same as the address provided on the envelope. This mismatch of addresses is most commonly used for blind copy (bcc) fields on messages to allow a message to be sent so that the recipient is unaware of the full extent of the address list. A receiving mail server typically routes received messages based on the address provided in the envelope.

In most instances, the address on the envelope corresponds to an account hosted by the mail server, but in other cases the address corresponds to an account hosted by a second mail server, and the first mail server simply transmits the message to the second mail server. This technique is well known and is employed when a mail server stores a list of forwarding addresses for mail redirection services, or in the event that the user for which a message is addressed has provided a forward file.

The ability of a mail server to route mail to another server based on the address in the message envelope has been exploited to provide users with pseudonymous email addresses, more popularly referred to as aliases. Aliases are provided by mail redirection services, and by some private mail servers to allow users to have multiple email addresses. Mail addressed to any of the aliases may be routed to a single mail account. This allows a user to provide unique addresses in different environments and then have his mail client perform routing and filtering on the basis of the address that the message was sent to. Using these techniques, a user can provide one address on a web page, and another address to a mailing list, and thus sort the messages on the basis of the address to which the message was sent.

While users can opt to delete an alias, if the address was provided to a mailing list the user must then subscribe to the mailing list using the new alias, or the mailing list messages cannot be routed to the user. In the case where an alias has been posted on a website, the website must be altered to direct viewers to the proper email address. Because of the rate at which senders of UCE are able to find addresses posted on common websites, or on websites hosting mailing list archives, it is common that an address posted in this fashion will start to receive increasingly large volumes of UCE within a week. The overhead associated with updating web pages, and changing mailing list subscription information on such a frequent basis renders this process inefficient. As a result the use of aliases has not been adopted as a common UCE control mechanism.

FIG. 1 illustrates a known alias routing system. Alias generator 50 provides an alias associated with an email address that is typically provided to a system connected to Internet 104. The alias information is provided to mail server 52, which stores the routing associated with the generated alias in routing list 58. Upon receiving a mail message over SMTP port 56, mail server 52 looks up the alias to which the message is addressed in routing list 58 and redirects the message to that address using routing engine 60. The address associated with the alias can be on the same mail server or a completely different server. One skilled in the art will appreciate that other functionality is offered by these servers depending on how they are administered. A more detailed description of how conventional alias generators operate is provided below.

Alias address management and creation is presently offered by a number of vendors. Typically, these alias generators are provided to users via either a website or a standalone application executed on the user's computer. From the perspective of a user, conventional alias generators are complex to use. Upon being prompted for an email address in a web based form, a user must either initiate a second instance of the browser, go to a generation page, request a newly generated alias, and then copy and paste it into the form, or the user must launch a standalone application, request an alias, and then copy and paste it into the form. In both these cases, the user is required to cut and paste, or copy-type, the alias into the web based form. Additionally, if information about whom the address was provided to is to be kept, the user must provide that information to the generator. This interaction with a different application typically increases the likelihood that the user will not fully use to functionality of the alias manager, thus diminishing its effectiveness.

Presently, standalone applications are available that work in conjunction with an alias server to provide a degree of alias management. Upon registering for the service, the user provides to a server a root, upon which all aliases will be based. This root is also provided to the standalone application. The server then associates the root with an email address. When the user generates an alias using the standalone application, the root is used, though it may be obfuscated in the process, to generate an alias. When email is sent to the alias, the server decodes the username portion of the email address and determines the address that it should be redirected to. This process does not require the standalone application to interact with the server, as all aliases based upon a single root can be mapped back to the original root, which is associated with a predefined email address. This approach reduces the computational load on the server, but in order to guarantee that the alias is not reused, the standalone application must have a used alias list, which would be reset if the application ever had to be re-installed. Further, the used alias list cannot be easily shared between two systems, creating difficulty for users that have more than one machine, such as a laptop for travel and a desktop for in office use. However, one weakness of the system is that in order to reduce the computational load on the server, there is no interaction with the standalone application, and all aliases that can be mapped back to the root name are forwarded to the email address provided. Thus, if a UCE transmitter can discern the root name through either inspection, or through comparing a series of provided aliases, the security of the system is compromised, and the user is then subject to the receipt of UCE.

To overcome these difficulties, web-based alias generators eliminate the standalone component of the above described system, and store the alias list at the server. This allows the mail server received an email addressed to an alias to determine if the alias is valid prior to forwarding the message. Additionally, it allows the operator of the server to provide the user with the ability to use multiple computers without running the risk of creating non-unique aliases. Uniqueness in the addresses is important, as it allows a user to uniquely identify an address with a website. This allows the user to determine the source of UCE. Web based generation systems still require the user to load a new web page to generate an alias, and then require the alias to be copied into the web based form. To allow for alias management, some web based alias generators alter messages addressed to the alias, so that when they are relayed to the correct email address a hyperlink is embedded within the message. This hyperlink allows a user to disable the alias upon determining that it is being used to transmit UCE. By embedding the management link, the user is provided with a mechanism for deleting an alias seamlessly, as the link can be directed to a HTML page that transmits an alias termination request to a server, and then is closed using a JavaScript™ command. However, the embedding of a management link causes problems when the body of an email message is digitally signed to authenticate the contents and prevent tampering. Though the embedding of a management link provides a seamless management functionality, it is incompatible with signed message bodies, and does not provide the user with a seemless alias creation mechanism.

It is, therefore, desirable to provide a method of reducing the incidence of receipt of UCE, while reducing the amount of user interaction in the process.

SUMMARY OF THE INVENTION

It is an object of the present invention to obviate or mitigate at least one disadvantage of previous alias generation, routing and management systems.

In accordance with a first aspect of the present invention there is provided a pseudonymous email address generator for generating a pseudonymous email address associated with an email address. The generator comprises a request interface and a pseudonymous email address creator. The request interface is for receiving a pseudonymous email address generation request from one of an external webserver in response to the creation of a webpage hosted by the external webserver and a web browser plugin. The pseudonymous email address creator is for creating a pseudonymous email address associated with a mail server in response to the received pseudonymous email address generation request, for associating the pseudonymous email address with an email address, for providing the created pseudonymous email address and the associated email address to the mail server associated with the pseudonymous email address and for providing the created pseudonymous email address to the one of the external webserver and web browser plugin. In one embodiment of the first aspect there is also provided a mail server interface and a request analysis engine. The mail server interface is for receiving from the pseudonymous email address creator both the pseudonymous email address and the email address associated with the pseudonymous email address, and for providing them to the mail server associated with the pseudonymous email address in a predetermined format. The request analysis engine is for receiving from the request interface an indication of the destination of the requested alias, for determining in accordance with the indication that the email address associated with the pseudonymous email address is a honeypot address.

In an embodiment of the present invention, the pseudonymous email address creator includes means for defining properties of the pseudonymous email address, the properties selected from a list including a friendly name associated with the pseudonymous email address, a management link and corresponding attachment method and the email address the pseudonymous email address is associated with, and for providing the defined properties to the associated mail server. In another embodiment the pseudonymous email address generator includes a rules engine for defining a set of routing rules in accordance with requests received by the request interface, for associating the defined set of rules with pseudonymous email addresses generated by the pseudonymous email address creator, and for providing the created set of rules to the mail server associated with the pseudonymous email address, and further includes both means for defining the routing rules in accordance with a set of parameters defined in the pseudonymous email address generation request and means for defining the routing rules in accordance with a set of default parameters, where optionally the default parameters are dependent upon a requester identifier associated with the pseudonymous email address generation request.

In accordance with a second aspect of the present invention there is provided a mailing list administration server for receiving email messages from users having registered email addresses and for distributing the received messages to recipients of a mailing list. The server comprises a pseudonymous email address creator, for creating a pseudonymous email address associated with both a mail server and the email address associated with a received email message, for providing the created pseudonymous email address and the associated email address to the mail server associated with the pseudonymous email address, and for replacing the registered email address associated with a received email message with the created pseudonymous email address prior to the distribution of the message to the recipients. In an embodiment of the present invention the pseudonymous email address creator includes means to replace the registered email address in both the header of the received message and the body of the received message with the created pseudonymous email address prior to the distribution of the message to the recipients. In another embodiment the server includes a database for receiving and stored mappings between email addresses and the pseudonymous email address associated with them and for providing the pseudonymous email address creator with previously created pseudonymous email addresses for use in replacing registered email addresses with created pseudonymous email addresses.

In third aspect of the present invention, there is provided a mail server for receiving and routing messages addressed to a pseudonymous email address. The mail server comprises a rule based pseudonymous email address processing engine. The rule-based pseudonymous email address processing engine retrieves a set of rules associated with the pseudonymous email address from a routing rules list. This retrieval is done in response to the receipt of a message addressed to the pseudonymous email address. Upon retrieval, the rules are used to determine routing information for the received messaged in accordance with the set of condition based rules. The processing engine additionally attaches a management link to the received message in accordance with a predefined preference associated with the pseudonymous email address. Preferably the management link is embedded in the message header, provided as an attachment or embedded in the subject line of the message and is a universal resource locator, a universal resource indicator, or an email attachment. In an embodiment of the second aspect, the mail server includes a user database. The user database receives messages from the rules based pseudonymous email address processing engine that have been determined to be associated with user accounts stored in the user database. The database then stores the received messages for retrieval. In another embodiment of the invention, the mail server includes an outgoing mail processing engine for receiving mail from an email client application, the received mail having both a destination address and a header, and for replacing a from address field in the header with a pseudonymous email address determined in accordance with the destination address.

In another aspect of the present invention, there is provided a method of generating a pseudonymous email address associated with an email address. The method comprises the steps of creating a pseudonymous email address, associating the created pseudonymous email address with the email address and defining set of preferences associated with the pseudonymous email address. The preferences include at least one of a management link style and a set of condition based rules, the set of condition based rules for use by a mail server associated with the pseudonymous email address to determine the routing of messages received addressed to the pseudonymous email address. In an embodiment of the present invention, the step of creating a pseudonymous email address is preceded by the step of receiving a pseudonymous email address generation request. In another embodiment of the present invention, the request is received either from a hypertext transfer protocol server in response to a request for an email address or from a web browser plug in. A further embodiment includes the step of providing the created pseudonymous email address to the source of the pseudonymous email address generation request. In yet a further embodiment, the step of creating the pseudonymous email address includes selecting a mail server to be associated with the pseudonymous email address, selecting a pseudonymous email address prefix, and creating the pseudonymous email address by combining the selected prefix with a suffix determined in accordance with the selected mail server. The step of selecting a prefix optionally includes one of combining a username prefix and username suffix selected from predefined lists, randomly generating a pseudonymous email address prefix and generating a pseudonymous email address prefix based upon a serialized order. In a presently preferred embodiment, the step of creating the pseudonymous email address includes creating a pseudonymous email address distinct from previously created pseudonymous email addresses. In another embodiment the step of defining the set of rules includes one of defining a number of messages that pseudonymous email address can receive over its lifespan, defining a time based lifespan for the pseudonymous email address, defining an origination email address from which messages will be received, and defining an email address to which messages are routed if other defined rules in the set are not satisfied. A further embodiment includes the step of providing the created pseudonymous email address, the email address associated with the pseudonymous email address, and the defined set of rules to the mail server associated with the pseudonymous email address.

In another aspect of the present invention, there is provided a method of routing messages addressed to a pseudonymous email address and received at a mail server. The method comprises the steps of obtaining a set of condition based routing rules associated with the pseudonymous email address, determining an email address to which the message associated with pseudonymous email address should be routed in accordance with the obtained set of rules, attaching a management link to the message in one of a predetermine number styles and routing the message to the determined email address. In an embodiment of this aspect of the present invention, the step of obtaining the set of rules includes consulting a routing rules list. In another embodiment, the step of determining an email address includes examining the message addressed to the pseudonymous email address to determine if the origination address matches an acceptable address as defined in the obtained set of rules and optionally includes determining that the message should be discarded, and transmitting a bounce-back message to the sender of the message addressed to the pseudonymous email address in response. In another embodiment, the step of attaching a management link includes one of embedding a universal resource locator in the subject line of the message, embedding a universal resource identifier in the subject line of a message, appending additional message header fields to the message header, attaching a universal resource locator to the message, attaching a universal resource identifier to the message, attaching a data file to the message, and attaching an executable file to the message.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
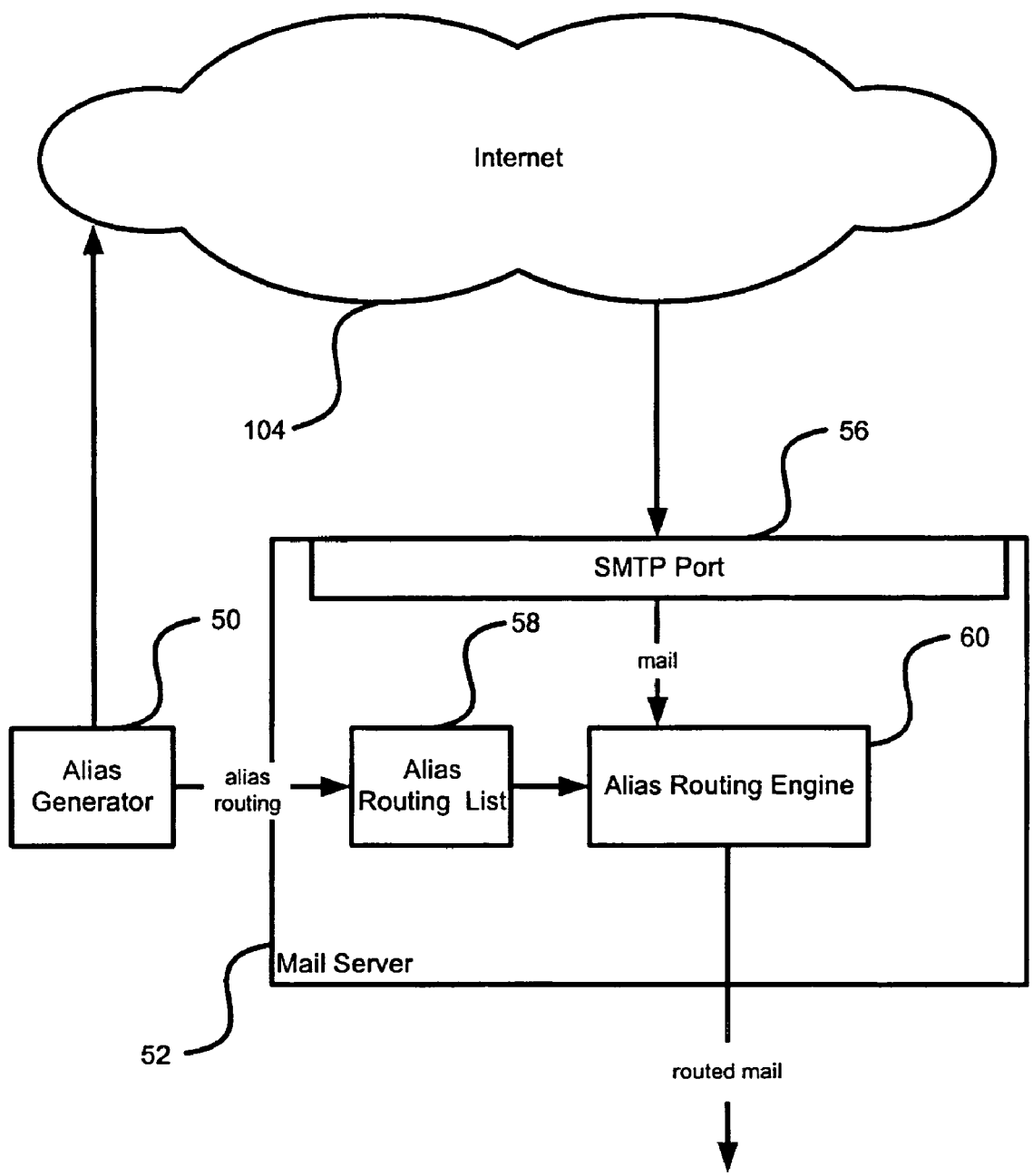
FIG. 1 is a block diagram of a system of the prior art.

Generally, the present invention provides a method and system for the generation and management of pseudonymous email addresses. This system and method can be employed to reduce the receipt of unsolicited commercial email (UCE). One aspect of the present invention provides a simplified mechanism for the creation of a pseudonymous email address, or alias. By simplifying the alias generation mechanism the present invention allows aliases to be provided in a one off fashion by automated generation requests. One skilled in the art will appreciate that an alias generator designed to response to automated alias generation requests allows for the generation of aliases in response to any of a number of predetermined events, and additionally in response to a user request. Associating routing rules with aliases in the present invention allows server-by-server, user-by-user, and alias-by-alias level control on how routing of incoming messages is handled. This multi-level control and centralised generation allows for a number of novel mechanisms to combat UCE. Though described below in terms of a novel rules based routing mechanism, mail servers and alias generators of the present invention need not rely upon rules based routing, and can instead determine message routing through the use of a simple lookup table or other known routing mechanisms.

Conventional alias management requires a user to either edit an alias routing list manually, or through the use of a web based form, to instruct the issuing mail server to delete an alias. A new alias then has to be created, and provided to either a mail server or placed in the hypertext mark-up language (HTML) web page. This process requires a great deal of user interaction, and requires that the user receive UCE at a volume that is often unacceptable, prior to the modification of the alias. Additionally, the user is required to determine though which alias UCE is being received, and deactivate that alias. Though a user can use a mail client to sort mail based on the alias that messages are sent to, this requires the user to constantly use the same mail client, which is not always feasible, and additionally requires that the user read new mail in a number of folders as opposed to a single inbox. The user can alternately view the header of the message to determine the alias. Due to the complexity of alias management, only a select portion of the email using population is able to perform alias management.

The present invention reduces the receipt of UCE by providing users the ability to have automatically generated aliases that can be processed using a rules based routing list. Additionally, the present invention provides the user with simplified alias management functionality to allow the user to deactivate an alias after reading a message addressed to the alias. By providing the user with alias management and creation facilities, the present invention provides the user the ability to create disposable email addresses, so that the harvesting of email addresses for UCE lists will result in the collection of addresses that cannot be relied upon to deliver UCE to a user.

The present invention is discussed in two stages. First, a method of alias creation is presented, outlining the creation of aliases for web pages, mailing lists, untrusted recipients and online forms, and the creation of rules that determine the routing associated with the alias. Secondly, methods of alias routing and management are presented, that allow the modification of the set of rules from the first phase to change alias routing or to remove the alias. Methods of automated alias creation are also presented to allow the dissemination of one-off email addresses through both static and dynamic web pages. The system for the creation and management of the aliases is also discussed.

Aliases in the present invention are generated upon request, however the request need not be directly initiated by a user. Instead the present invention provides a mechanism for automatically generating aliases for use on a website, or for use in conjunction with a mailing list. Additionally, mechanisms for both creating and managing aliases seamlessly are provided so that a user can insert an alias into a web based form without leaving the web-browser or going to another page, and so that a user can modify the properties of an alias seamlessly. In a further embodiment, a mechanism for the creation of an alias provides the user with a seamless interface to an email client. The seamless interface can be achieved through either the design of the email client application or through a plug-in architecture. Using this interface, a user can reply to a message sent to an alias and have the reply email transmitted so that the alias appears as the "from address". Additionally, a user sending email to an address for the first time can specify prior to transmission that the message should be transmitted with an alias as the "from address". One skilled in the art will readily appreciate that the changing of the "from address" can be done by a mail server such as the one described below. Preferably, the email client application provides an indication that the "from address" is to be rewritten through use of additional header fields, or other such markers, and the mail server prior to sending the message rewrites the header information so that the "from address" is an alias.

Figure 2:
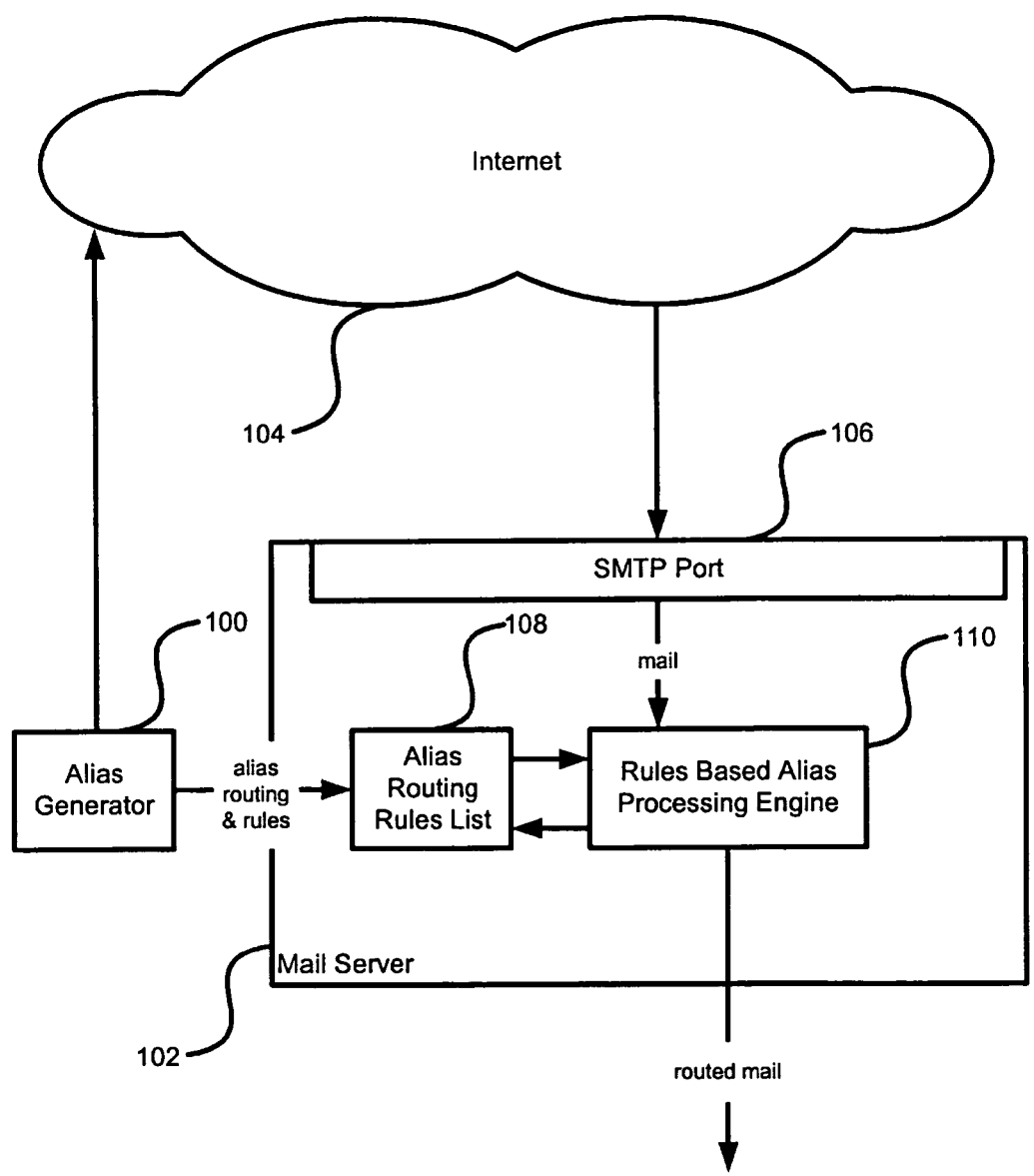
FIG. 2 is a block diagram of a system of the present invention.

FIG. 2 illustrates an alias generator and mail server of the present invention. Alias generator 100 is operatively connected to mail server 102 to provide generated aliases along with routing information and a set of rules associated with the alias. Mail server 102 is connected to a data network such as Internet 104 for receiving mail messages. Preferably mail server 102 receives mail messages from other network nodes over SMTP port 106. Typically incoming mail messages are comprised of an envelope and a payload, the payload including both a header and a message body. Mail server 102 also preferably includes alias routing rules list 108, and a rules based alias processing engine 110. In operation, alias generator 100 provides an alias to a node of Internet 104, and provides both the alias and a set of rules associated with the alias to mail server 102. Rules are stored in list 108, which is accessed by processing engine 110, when a mail message is received on port 106 addressed to the issued alias. Preferably the rules stored in list 108 are condition based rules, that determine the routing of an incoming message based on a series of conditions. In response to an alias generation request, the present invention preferably provides both an alias, and a set of rules used to determine how a message addressed to the alias will be routed. Upon receiving a message addressed to the alias, mail server 102 uses processing engine 110 to determine how the message is routed in accordance with list 108. Communications between alias generator 100 and mail server 102 are preferably performed using standard TCP/IP connections. However, one skilled in the art will appreciate that communication between alias generator 100 and any other system can be made using a number of protocols including HTTP, SHTTP, HTTPS and any number of custom protocols.

The set of rules stored in list 108 is provided by alias generator 100 and is used by processing engine 110. The rules can include, for example, the number of times that the alias can receive a message, the length of time that an alias is valid and the email address from which an email message can be received. In operation, the SMTP port 106 receives a message, and provides it to processing engine 110. Processing engine 110 uses the characteristics of the received message and the rules stored in list 108 to determine how the message will be routed. For example, if the alias was generated for use with a mailing list, alias generator 100 will provide a rule to mail server 102 for storage in list 108. The rule associated with the alias in this example will determine that the messages addressed to the alias are to be routed to a valid email address if the origination address of the incoming message is the address corresponding to the mailing list. In the alternate, mail server 102 will either generate a bounce-back message indicating that the no user existed with that address, or it will simply drop the message without any indication. In an alternate embodiment, messages received by mail server 102 will be redirected to a honey-pot address for analysis and possible use in UCE detection algorithms. One skilled in the art will appreciate that both the generation of the bounce back message and dropping the message without indication are known in the art.

Figure 3:
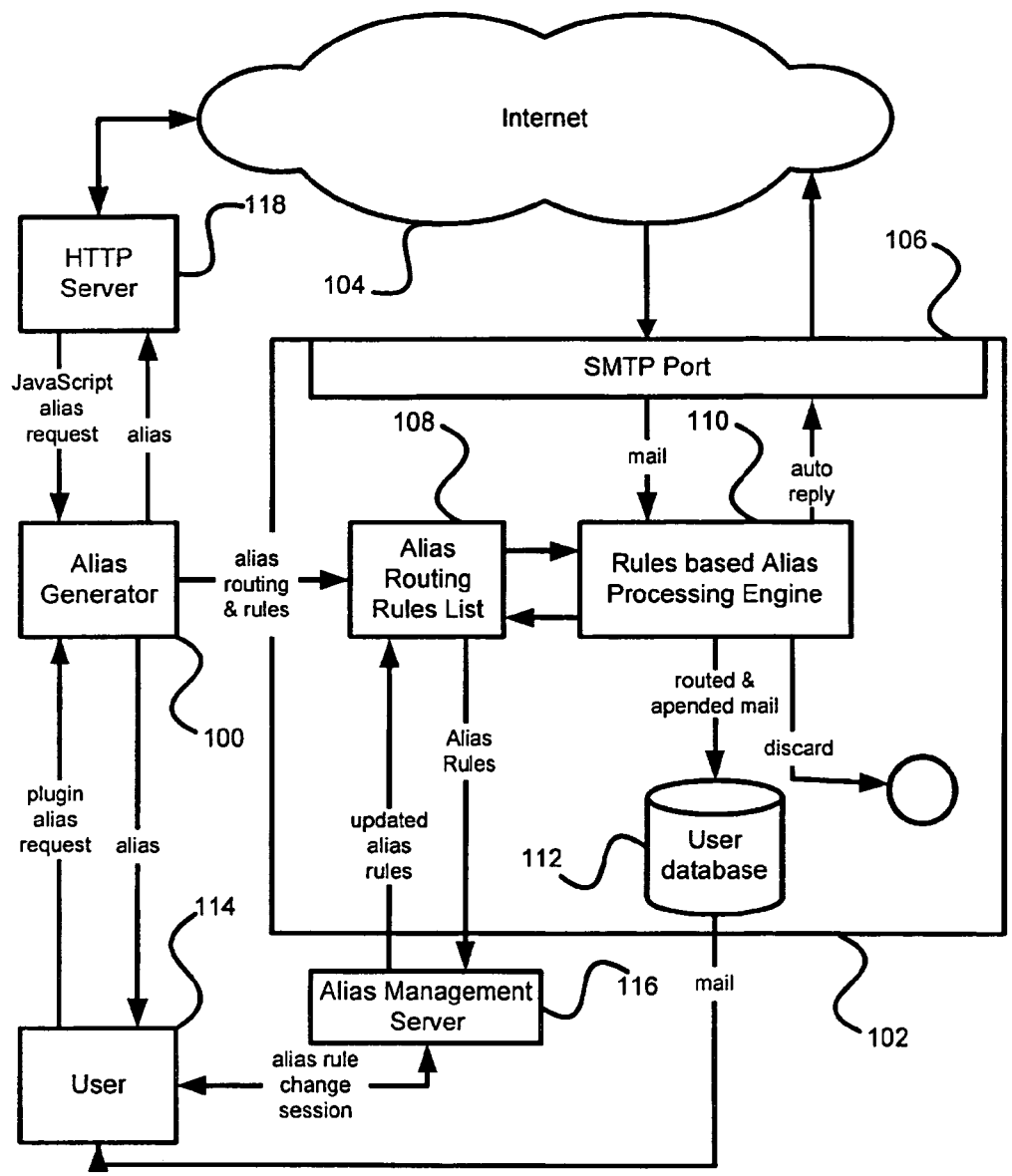
FIG. 3 is a block diagram of a system of the present invention.

FIG. 3 illustrates an alternate embodiment of the present invention. As before, alias generator 100 provides aliases and rules to mail server 102, for storage in list 108. The rules in list 108 are used by processing engine 110 upon receipt of a message received on the SMTP port 106 from Internet 104. Processing engine 110 uses the rules in list 108 to determine the routing of incoming messages based on the alias of the incoming message and the rules provided by generator 100.

FIG. 3 illustrates an embodiment of the present invention, where an alias is established by a user having an account hosted by mail server 102, which resides in user database 112. Messages destined for a user of mail server 102 are stored for future retrieval in user database 112. As with the earlier embodiment, messages can alternately be routed to another mail server. If a message is received that is addressed to an alias, and it is determined that the message should not be routed to a user, it can be routed either to discard, or a message can be generated by processor 110 and sent as an autoreply to SMTP port 106 for transmission to the sender of the inbound message.

Alias generator 100 is operatively connected to a hypertext transfer protocol (HTTP) server 118 to allow it to provide HTTP server 118 with aliases upon request. Additionally alias generator 100 is responsive to user 114, and can assign an alias upon request from user 114. Examples will be provided below to outline the operation of this system in conjunction with either HTTP server 118 or user 114, who interacts with an alias management server 116. Preferably, alias management server 116 is an HTTP server that has a management connection with routing rules list 108.

As before the alias generator 100 provides both aliases and routing rules to mail server 102, which stores them in list 108. Processing engine 110 routes received messages addressed to aliases based on the rules stored in list 108 and associated with the aliases. To provide alias management, processing engine 110 can modify the payload of an incoming message, to provide an alias management link to the user. By clicking on the alias management link, user 114 is directed to alias management server 116, which retrieves the settings, from list 108, associated with the alias to which the message was sent. One skilled in the art will appreciate that processing engine 110 can append a HTTP link to a dynamically generated web page hosted by alias management server 116, and encode alias identifying information in the provided universal resource locator (URL). Upon receiving the request for the page associated with the encoded URL, alias management server 116 retrieves the alias associated information from list 108 and provides user 114 the option of changing the routing options associated with the alias. For example, the user provides an alias to a company that requires a valid address at sign up, the alias can be set to allow all mail to be sent to the user. If the alias is subsequently used to send the user UCE, the user can click on the link added to the message to change the routing options such that messages addressed to the alias are directed to an account used for a UCE filter. This allows the alias to receive mail that is used to refine filtering applications, in the art this account is referred to as a honey pot address. Additionally, to protect the integrity of a digitally signed message body, the link can be placed in the subject line of the message. Alternately, to protect the integrity of the message body by placing management links and information in additional message header fields. Many mail readers have the ability to display customisable information referenced in a message header, and this functionality can be employed by the present invention to provide alias management. As will be apparent to one skilled in the art, it may be beneficial to make any management link, embedded in the body, subject line or message header, time limited, or single use to provide security, and a degree of authentication.

As an alternate to the provision of a URL as a management link in a message body, header or subject line, embodiments of the present invention allow for a number of other mechanisms to provide management facilities. In one such embodiment, the management link is provided as a universal resource identifier (URI) which directs the user to a web based service that provides management facilities. The URI can be appended to the message body, the header, the subject line and can additionally be provided as an attachment to the message body. Another embodiment provides the management facilities through the inclusion of an executable file as an attachment that allows the user to retrieve the management information and update it. The file can be a self executing file or can be a data file used by an application resident on the system of the user. In these embodiments, the information associated with the alias can either be provided in the management link, or can be stored by alias management server 116 for retrieval. This allows for web based mail applications, and others that support XML based extensions, plugins or have built in specific support, to display the management information without requiring the user to activate the management link or application.

In another embodiment, the management link or application can provide information to the email client, whether it is a standalone application a server provided application, or a web based mail client, with the alias that the message was sent to. This information can be used by the email client to replace the sending email address transmitted if the user replies to a received message. This provides a substantially transparent experience for the user, and protects the user's identity if a message is replied to. This can be accomplished through either server-side interactions, or client side interactions, without direct involvement of the user, whereas many prior art mechanisms do not provide such a transparent experience. One skilled in the art will appreciate that, as described above, the replacement of the "from address" can be performed by the mail server instead of the client in alternate embodiments of the invention.

Depending on the setup of the mail server, receipt of mail directed to an inactive alias can generate either a bounce-back message, or the message can simply be discarded. Thus, through an interface between alias management server 116 and routing rules list 108, along with message editing by processing engine 110, an automated alias management mechanism can be provided.

Figure 4:
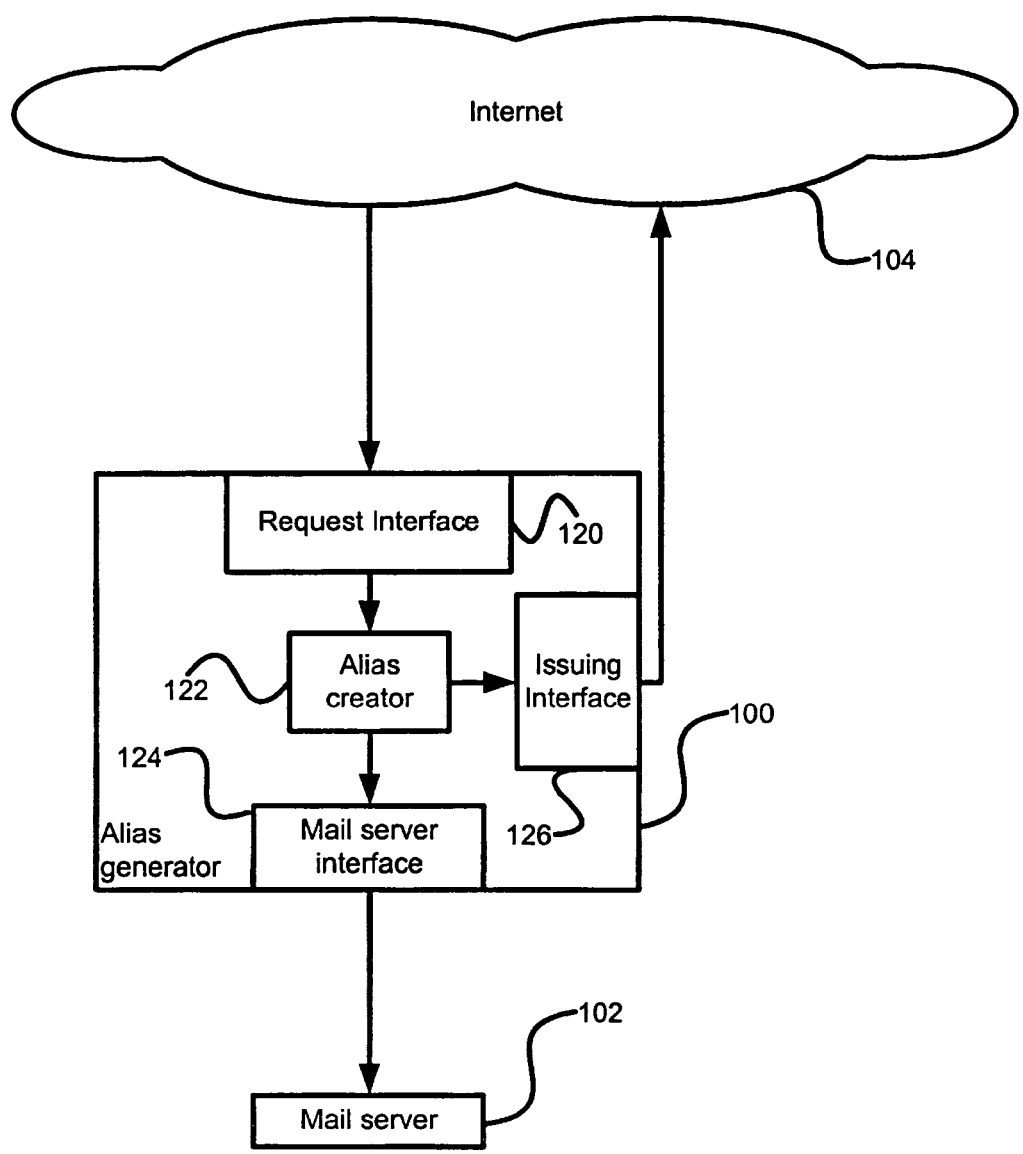
FIG. 4 is a block diagram of an alias generator of the present invention.

As illustrated in FIG. 3, alias generator 100 can interact with a number of interfaces to automate the creation and provision of aliases. Two such interfaces are illustrated: an HTTP server interface, through which alias generator 100 communicates with HTTP server 118, and a user interface through which it communicates with user 114. FIG. 4 illustrates in greater detail the logical formation of alias generator 100. Alias generator 100 includes request interface 120 through which requests from nodes of Internet 104 are received. These requests are provided to alias creator 122, which creates the alias and associates it with a user email address and a set of rules. The created alias is provided to issuing interface 126 for transmission to the requesting node of Internet 104, while the alias, the associated email address, and the set of rules are provided to mail server interface 124 for direction to mail server 102.

Typically web pages provide an email address as contact information for individuals associated with the page. Thus, employees typically have their email addresses displayed on corporate websites. This is typically done to allow people external to the corporation to reach the employee. These addresses are typically provided in a standard mailto: link that allows people to click on the link and send mail. By supporting automated generation of aliases, the present invention allows each contact link to be associated with an alias. In a presently preferred embodiment aliases are generated when a user clicks on a contact link. As described below, the webserver transmits an alias generation request using http, another standard protocol, or a customised protocol, and in response receives an alias for placement in an HTML page that is then sent to the user. Preferably a popup window is used to deliver the generated alias link, and in a presently preferred embodiment, Javascript™ is used to automatically activate the link and close the pop-up window. This will be described in more detail below.

One skilled in the art will appreciate that request interface 120 and issuing interface 126 can be implemented in many ways. As shown in FIG. 3, one embodiment of the request interface is an HTTP interface, designed to provide HTTP server 118 with an alias upon receiving a request. To simplify the request, JavaScript™ may be employed on a web page to automate some of the interactions required to issue the request. In implementation, a web page is designed to replace a mailto: link with an HTTP request to the request interface 120. This request results in the issuance of an alias by the issuing interface 126. The issued alias is provided to HTTP server 118, which provides the alias to the user as a mailto: link on a separate page, which is preferably contained in a pop-up window. In a presently preferred embodiment, JavaScript™ is used in the pop up window, so that the mailto: link can be immediately launched, and the window can be closed. This allows for a seamless user experience, as the user clicks on an apparent mail link and the final result is the launching of the designated mail application. A user without JavaScript™ enabled will instead be presented by a pop up window with a mailto: link in it. After clicking on the link the user would then have to close the pop up window. As previously described, the request for an alias is received through interface 120 and is provided to the alias creator 122, which creates an alias and preferably associates it with an address that provided along with the alias request. This association can be used as the foundation for a set of rules that are created to direct how mail addressed to the alias will be handled by mail server 102. When the alias and its associated rules are created, they are provided to mail server 102 through mail server interface 124, and the alias is provided to the requesting node through issuing interface 126. In a presently preferred embodiment, the set of rules is transmitted either as a series of arguments along with the request, or are set by default. The default is preferably determined by either the server or a requesting identifier that is transmitted with the request. The design of the issuing interface 126 is preferably done in concert with the design of request interface 120, so that a defined Application Program Interface for interacting with alias generator 100 can be provided to requesting nodes. In a presently preferred embodiment, an HTTP server, such as server 118, makes a request through a link that loads a page to make a request to issuing interface 120. The loaded page preferably is provided in a separate browser window and uses JavaScript™ to automate the user experience by launching a mailto: link addressed to the alias issued in response to the request and then closing the page. While in the prior art a mailto: link would be placed on a page, the present invention can provide a mechanism to replace the mailto: link so that no valid address is provided to UCE list building robots in the webpage. A client mail application is then presented to the user with the destination address field filled in with the generated alias. If the user's browser does not support the auto-forward function, or does not support JavaScript™, the new browser window is left open, and the user can then click on the provided mailto: link.

If an email address harvesting application comes across the web page, an email address is not provided in a form that can be added to the UCE distribution list. Even if the harvesting application is sufficiently advanced to trigger the email link, and acquire the alias, the rules associated with the alias can be designed to restrict the utility of the generated alias. One such example of a rule of this type is that the alias only receives messages for a fixed period after generation. Alternately, the alias can be made valid only for the receipt of a fixed number of messages, or some combination of the two. Thus, even if a harvesting application is able to acquire an alias, either only one piece of UCE can be delivered, or UCE can only be delivered during a defined time window. After either of these conditions is no longer satisfied, any UCE transmitted to the alias will not be properly routed to an email account. However, the alias will be valid for the first message, and that message will be routed appropriately. Thus, for a commercial concern that requires an email address to be posted on a website, a disposable email address can be generated for one time use using the automated rule generation of the alias generator 100 of the present invention, in conjunction with the rule processing engine 110 of the mail server 102 of the present invention. Additional mail handling techniques for mail received and determined to be outside the defined rules will be described below.

In another embodiment, HTTP server 118 provides dynamically generated pages using conventional HTML scripting languages such as perl and PHP. Upon generating a page with a mailto: link, HTTP server 118 requests an alias from alias generator 100. Upon receiving the alias from generator 100, HTTP server 118 provides what appears to be a static HTML page to the viewer, complete with a functioning mailto: link. The generated alias can be associated with a predefined set of rules as in the previous example.

It is common for the link to an email address that is provided on web pages, to show the email address on the page. This allows a viewer of the page to write the address down or print it out for use at a later time. To facilitate this in conjunction with the alias generation, the mail link can be provided attached to text that is HTML encoded to both obfuscate the address to a harvesting script reading the page source and provide a viewer with an understandable address after the HTML has been rendered. Alternately, the mail link can be provided in a number of other fashions intended to stymie harvesting scripts, including providing the email address as an image file representation of text, or providing part of the email address as an image while the other part is text.

In both of the above examples, where the requesting interface 120 was designed for interaction with HTTP server 118, it is possible to combine alias generation and IP address logging to set up so-called honey-pot email addresses. By logging the activity of requesting nodes, HTTP server 118 can determine that a given requesting node has activity characteristics similar to a profile established for an email address harvesting script, such activity including rapid and successive page requests. Upon detecting that the requesting party is likely a harvesting script, HTTP server 118 can provide alias generator 100, or mail server 102, with an indication that an alias provided to a specified IP address has likely been provided to a harvesting script. If the initial alias request includes the requesting node's IP address, alias generator 100 can modify the alias routing rules list 108 to direct all mail to that alias to discard. Alternately, the alias can be used as a honey pot email address. One skilled in the art will appreciate that other techniques, in addition to IP address logging can be employed to detect if a single entity is making multiple alias requests, or is behaving like a harvesting script. Any of these known techniques can be employed in place of the IP address logging described above to alter the alias routing rules.

One skilled in the art will appreciate that upon requesting a page from an HTTP server an IP address, or other identifying information, is provided to the HTTP server so that the response to a page request can be provided to the correct address. In doing this the requesting node provides identifying information that can be provided to the alias generator 100 by the HTTP server 118. Alias generator 100 can receive from HTTP server 118 a set of information in the alias generation request. Identifying information includes information such as the IP address of the node making the HTTP request. The IP addresses associated with incoming requests can be stored by alias generator 100 and correlated to monitor alias request activity. Because alias generator 100 can serve a plurality of HTTP servers, alias generator 100 is in a position to determine that a node requesting e-mail addresses is a harvesting application. Thus, if a plurality of HTTP servers all request generated aliases to be provided to a single IP address alias generator 100 can recognize that the servers are being accessed by a harvesting application, and that the provided email addresses will be added to a UCE distribution list. Thus, alias generator 100 can provide either a generated alias whose routing rules designate a honey pot e-mail address as the destination, or can provide an e-mail address of a honey pot destination directly. In this way, alias generator 100 can aid in the gathering in information used to create accurate filters, and to update real time black hole lists.

Another embodiment of the alias generator 100 of FIG. 4 utilizes the plug-in structure of popular web browsers to provide a user with the ability to generate an alias include on to online forms. Many services on the Internet require a valid email address to be provided during registration. However, some of these services sell their subscriber email address list to senders of UCE. To both allow a user to register for these services, and to avoid receiving UCE, the user can instead provide an alias generated by alias generator 100 in response to a request sent by a browser plug-in. For example, from the browser, the user selects the field in which an email address is supposed to be entered, right clicks in the field, and selects from a context sensitive menu to generate an alias. After making this selection, the plug-in transmits a generation request to request interface 120, and alias generator 100 provides an alias associated with the email address of the user. In a one embodiment, the plug in provides alias generator 100 with an email address to associate with the generated alias, and then provides user 114 with a new browser window and a connection to alias management server 116, which allows user 114 to modify the alias routing rules provided by alias generator 100 to mail server 102. This allows the user to determine how many email messages can be received by the alias before it is deactivated, how much time should elapse before the alias is deactivated, or any other such rules, as are appropriate. User 114 can also specify how messages addressed to the alias should be handled after the defined conditions are met. User 114 may determine that a bounce back message should be sent indicating that the address is no longer valid, or that the messages should simply be discarded.

Because of its integration with the web browser, a plug-in style alias generator interface can be used to provide enhanced management services. While prior art systems allow a user to track whom an alias was given to, they require the user to enter the tracking data. In practice, user apathy increases over time and the alias tracking facilities are neglected. Due to its integration with the browser, the plug-in can transmit website identification information to the alias generator 100 which can store the information along with the alias routing information. The plug-in, or alias generator 110 can also interact with the website to obtain a copy of a privacy policy, in accordance with standards such as the Platform for Privacy Preferences (P3P) standards. Thus, user 114 can provide an alias to a website, and have the privacy policy recorded so that if UCE is received, it can be determined if the privacy policy has been violated. In another embodiment, alias generator 100 obtains, either directly from the plug-in, or from the website privacy policy, a set of email addresses that mail will be received from, so that any message received from another address can be discarded. One skilled in the art will appreciate that the implementation of both the plug-in and the interface between the plug-in and generator 100 can be achieved using standard application programming languages or scripting languages. In one embodiment, the alias generation request sent by the plug-in is of a similar syntactical structure to those issued by HTTP server 118. This allows for a single alias generator 100 to issue aliases to both a webserver and to individuals using the plug-in interface.

Thus, the system of the present invention provides users a simple mechanism for both creating aliases, through a browser plug in, and a convenient mechanism for modifying the alias routing rules, through either added message header fields or a click through link embedded in the message body by processing engine 110 that directs a web browser to an HTTP interface to list 108, hosted by alias management server 116. Additionally, the system of the present invention allows for the automated creation of aliases for placement on a web page, that can define strict routing conditions, including the lifespan of the alias in terms of time, the number of messages it can receive, or a function of the two or other rules. A mechanism for receiving the aliases at a mail server is provided using processing engine 108 which uses simple processing of rules to determine how an alias is routed. The methods of the present invention are described below.

Figure 5:
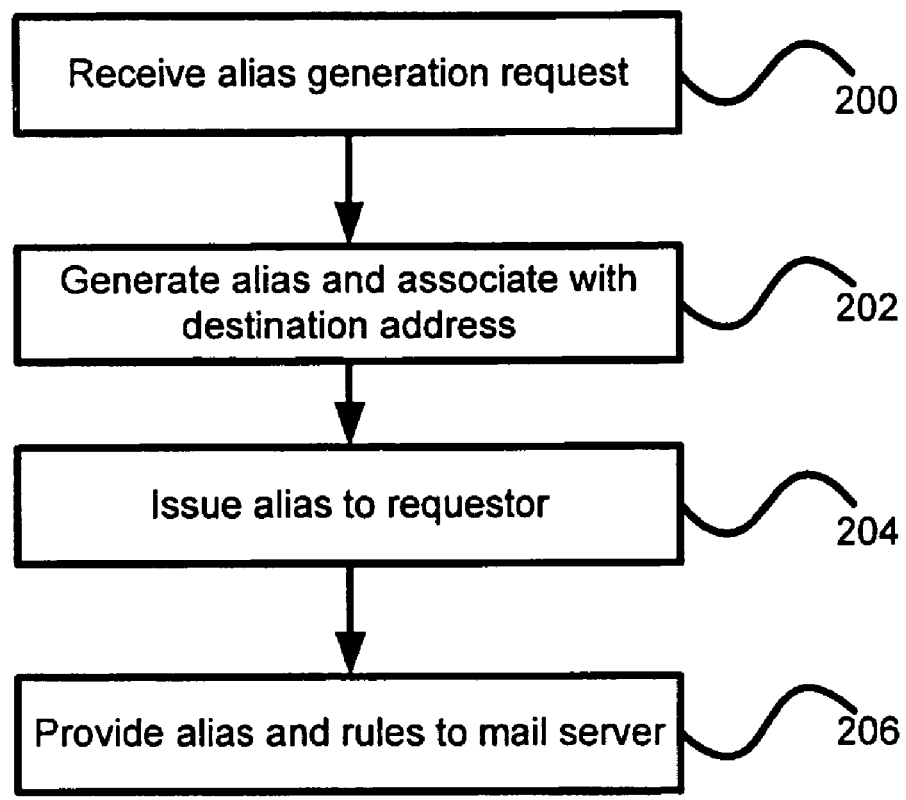
FIG. 5 is a flowchart illustrating a method of alias generation according to the present invention.

FIG. 5 illustrates a method of generating an alias using alias generator 100. Alias generator 100 receives an alias generation request from a requestor in step 200. The alias generation request is preferably received through request interface 120. In step 202, an alias is generated, and is associated with a destination address and a set of rules. The generated alias is then provided to the requester in step 204, and the alias along with destination address and the set of the rules is provided to the mail server in step 206. One skilled in the art will appreciate that the alias generation of step 202 can be performed in a number of ways. It is common for many aliases to be generated randomly, and so they appear as a set of number and letters in place of the user name. Though this may be effective for providing to a web server to create a link to, it may be preferable to provide an alias with a name that does not appear as random, when the alias is generated for a form. In this case, instead of allowing the generation of a set of numbers and letters, an alias can be selected from a pool of available aliases, that are recycled after use. Thus, after an alias has been used, and has expired, it is possible for that alias to be reissued after a sufficient amount of time. In a presently preferred embodiment a sufficiently large selection of prefixes and suffixed allows the potential address pool to be sufficiently large that a recycling of addresses is not required. Aliases can also be generated using combinations of prefixes and suffixes selected independently from a sufficiently large pool, and with a history of recently issued aliases, so that the probability of repetition of a still valid alias is statistically insignificant. One skilled in the art will appreciate that other alias generation techniques including serialized aliases can easily be implemented using standard programming techniques.

The generation of the rules associated with the alias, and the destination address to associate with the alias can be done in accordance with predefined settings, in accordance with options provided along with the generation request of step 200, or a combination of the two. In the first case, alias generator 100 may be dedicated to a particular HTTP server, such as HTTP server 118, so that messages addressed to generated aliases are routed to the same destination address, and each alias is generated with an identical set of rules. One example of this is an alias generator specifically linked to a corporate web server that provides a contact address for customers. When the customer clicks on the email link, an alias is generated, and all messages sent to that alias are routed to a fixed address. Because the alias is defined for use with a single address, and all requests can be treated identically, a set of rules can be stored by alias generator 100, and used by alias creator 122 for association with each generated alias. In this example, all aliases would be aliases to the same email address, and would have identical rules, such as that they are valid for a 25 minute time span after their creation, and that they can only receive one message each. Thus, in step 206, alias generator 100 provides to mail server 102, through mail server interface 124 the generated alias, the address that messages to that alias should be routed to, and the rules specifying that the alias is valid until a defined time, and that the alias is valid only for the receipt of one message. In the instance that alias generator 100 communicates with more than a single requestor, or it communicates with a single requestor that requires aliases to be associated with multiple email addresses, the request preferably identifies a minimum of the destination email address that the alias should be associated with. The request can also specify a series of other parameters, such as the lifespan of alias, whether the alias should be randomly generated, selected from a pool, or created by combination of selected prefixes and suffixes, and an email address that messages should be accepted from, as well other rules that can be used to determine the routing of messages addressed to the alias. One skilled in the art will appreciate that generation of the alias, as well as generation of the set of rules associated with the alias, can be performed in accordance with information provided in the request. As described above, a set of default rules can be established on a user-by-user basis, and then used in the generation of the rules. In such an embodiment, the alias generation request includes a requestor identifier which is used by alias generator 100 to determine the predefined default rules to be attached to the generated alias. Additionally, a requester identifier can be associated with information such as an IP address from which a request can be received, this provides a rudimentary mechanism to prevent an unauthorised party from requesting aliases on behalf of a corporation or individual.

Furthermore, one skilled in the art will appreciate that the issuance of the alias to the requestor in step 204 and the provision of the alias and the associated rules in step 206 can be reversed, or done simultaneously without departing from the method. In an alternate embodiment of the present invention, rules for aliases generated by alias generator 100 can be defined and provided to mail server 102 in advance. All aliases generated by alias generator 100 would then have the same rules attached to them, so only the generated aliases and destination address are provided to mail server 102, which then adds the predefined rules to the generated aliases.

Figure 6:
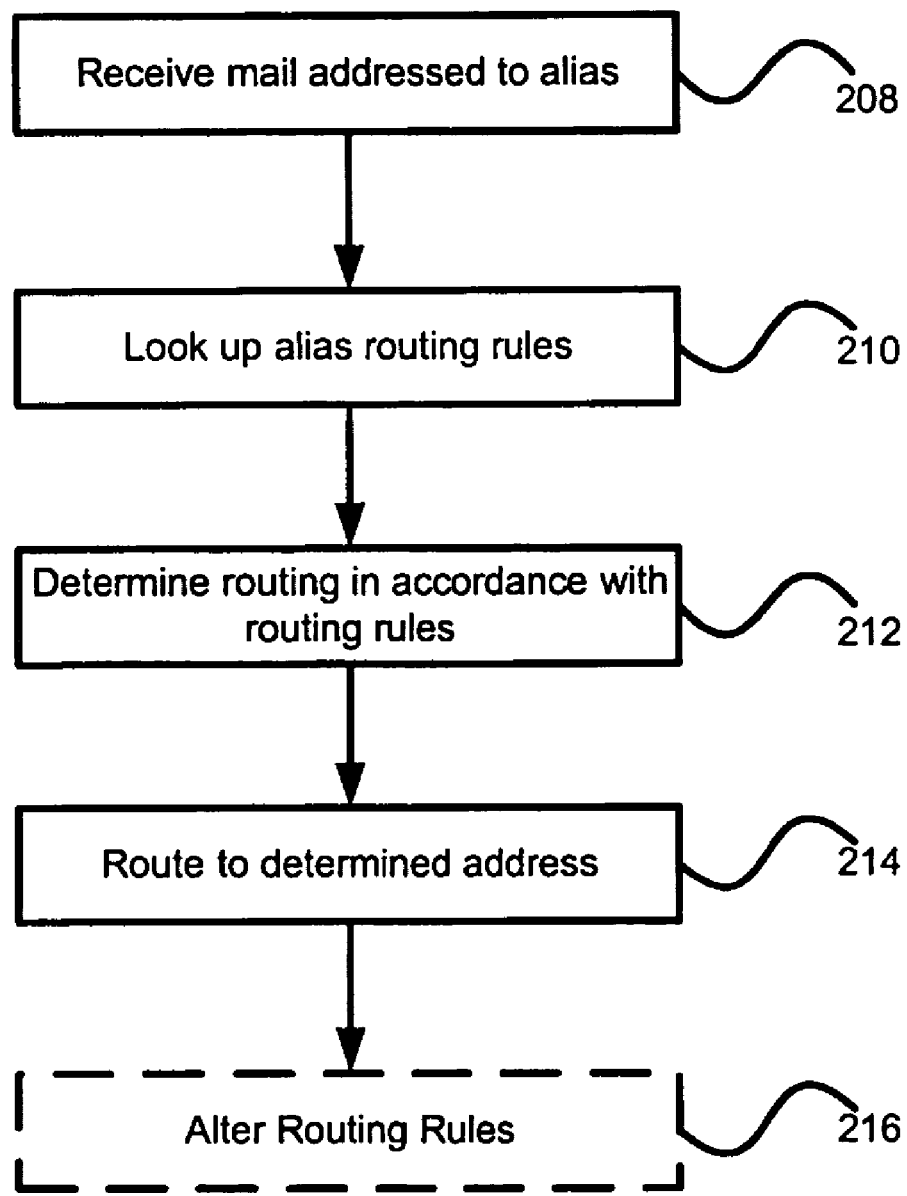
FIG. 6 is a flowchart illustrating a method of alias generation according to an embodiment of the present invention.

FIG. 6 illustrates a method of receiving and routing a message addressed to an alias. In step 208, mail server 102 receives an email message addressed to an alias, preferably through SMTP port 106. The message is then provided to processing engine 110, which requests, from table 108, the routing rules associated with the alias in step 210. In step 212, a routing for the received message is determined in accordance with the rules obtained in step 210. Based on the determined routing, the message is provided to the determined address in step 214. Optionally, in step 216 the routing rules list 108 is modified to account for the receipt of the message.

Thus, if a message is received addressed to an alias, the rules associated with the alias are used to define where the message will be routed. If the rules for an alias indicate that the first message received addressed to the alias is to be routed to a customer service email account, but only if the message is received by a predetermined time, and a first message is received within that time, processing engine 110 will route the message to the customer service account in step 214. However, if there is a second message received, or the first message is not received in time, the message will be handled according to exception rules associated with the alias. In accordance with the rules, the message may be either dropped, also referred to as being sent to the bit bucket, or the message may be discarded and an autoreply message transmitted to the sender informing him that the account is no longer valid, and that a new address can be obtained by visiting an issuing website. In one embodiment, the autoreply includes a link to a web page that will both re-issue an alias and will allow the user to have the originally sent message placed in a new message body. If it is determined that an alias has been issued to a harvesting application, the routing rules can be set to direct all email to an account reserved for a mail filter application, so that the filtering application can use the incoming mail to test filters and heuristic detection algorithms. This allows the alias to function as a honey pot address. In another embodiment, the alias can be used as a honey pot address, and only the headers of the message are provided to the account, so that storage space is preserved. The header of the message can be used to determine both filters and for determining which servers should be added to a real time black hole list.

In instances where the routing rules dictate that an alias is only valid for a fixed number of messages, optional step 216 allows processing engine 110 to modify the rules stored in list 108 to decrement the number of messages that will be accepted. Other techniques known to those skilled in the art can be used to track the number of messages received on an alias. Other dynamic rule modifications will be apparent to those skilled in the art.

Figure 7:
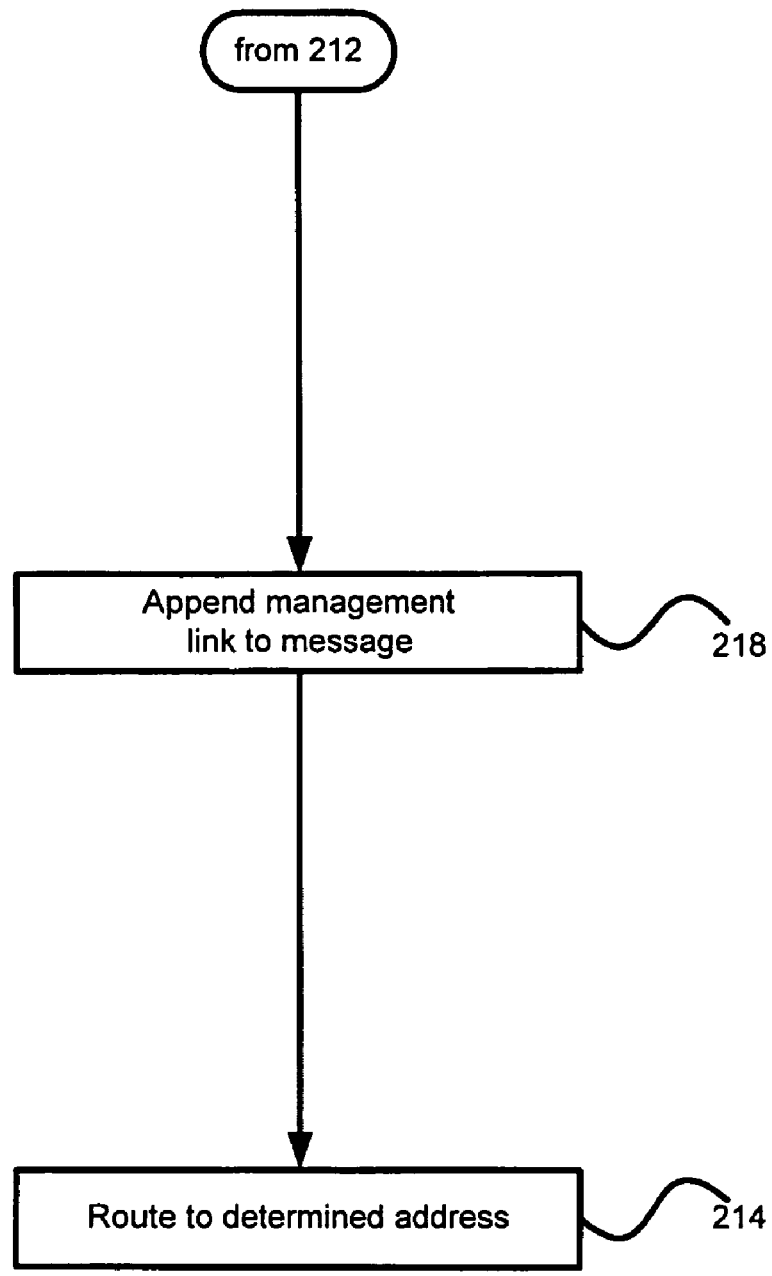
FIG. 7 is a flowchart illustrating a method of alias management according to an embodiment of the present invention.

FIG. 7 illustrates the steps performed by processing engine 110 to provide simplified alias management as described above in relation to the system. After step 212, where processing engine 110 determines the routing for the message, it appends a management link to the message in step 218. As described above, the management link can be appended to the message body, the message subject line or it can be appended to the message header. In a presently preferred embodiment, the link is an html link that directs the user to alias management server 116. The link is preferably to an encoded URL that allows alias management server 116 to determine the alias that is being managed. The link can be generated based on the retrieved rules, and provided in a fashion that is in accordance with an API defined for the operation of mail server 102. After appending the management link, processing engine returns to step 214 and routes the message to the destination address. In one embodiment, a summary of the rules is appended to the message along with the link the management utility. In an alternate embodiment, the link is placed in extra header fields in the message so that the integrity of the message body is not compromised. As discussed above, any of a number of attachment mechanisms can be used.

Though presented in the above discussion as a destination address, one skilled in the art will appreciate that messages received to an alias can be routed to multiple addresses, or to an address selected from a pool. If an alias is provided to a user to allow the user to contact a customer service position, the determination of the alias routing in step 212 can be performed to distribute incoming mail messages to the different members of a customer support team on a round robin basis. Thus, the first message received addressed to an alias could be routed to the first member of the support team, and the next alias received, which may differ from the next alias issued, could be routed to the second member of the support team. As one skilled in the art will appreciate the routing of the message can be done in a round robin fashion based on receipt of messages, based on the issuance of aliases, based on a heuristic analysis of the title or body of a message, or based on other rules that can be provided to processing engine 110 by list 108. Routing based on heuristic analysis can be performed to help route service requests to support team members with a specialization in a particular area.

Figure 8:
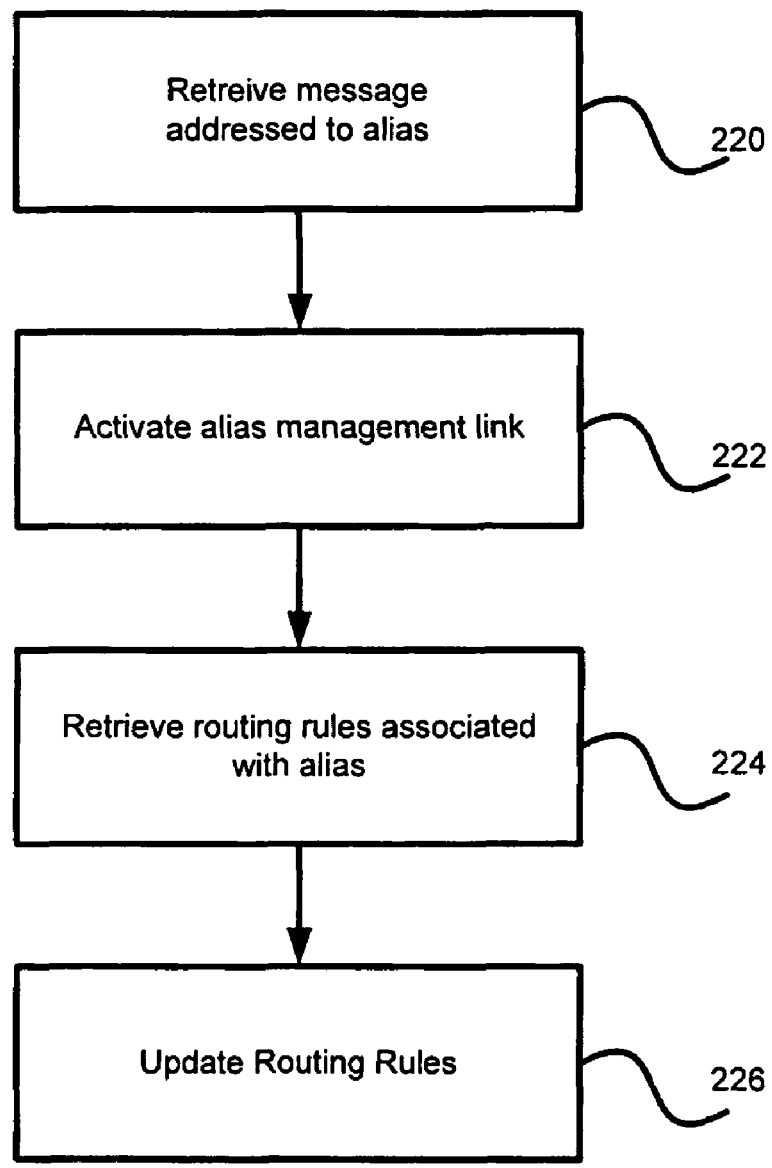
FIG. 8 is a flowchart illustrating a method of user controlled alias management according to an embodiment of the present invention.

FIG. 8 illustrates a method of the present invention for management of aliases after routing by the mail server 102. User 114 retrieves a message addressed to an alias in step 220. Embedded in the body of the message is a link to an alias management facility. In a presently preferred embodiment, the alias management facility is provided by a standard HTTP server accessing list 108 to retrieve and modify the rules associated with an alias, however one skilled in the art will appreciate that the link to the alias management utility could equally be a perl script used to provide mail server 102 with a new set of rules to associate with the alias. Other implementations of alias management applications linkable in a mail message will be apparent to one skilled in the art. After retrieving the message in step 220, user 114 activates the link to the alias management facility in step 222, preferably by clicking on an encoded URL that launches a browser to alias management server 116. In step 224, the alias management utility retrieves the set of rules used to determine the routing of messages addressed to the alias from list 108. User 114 can then alter the alias routing rules, to define new conditions used by processing engine 110 to determine the routing of messages addressed to the alias. The altered rules are then provided as a set of updated rules to list 108 in step 226. One skilled in the art will appreciate that various implementations and user interfaces to provide user 114 with alias management functionality can be implemented using known programming techniques and data constructs. In one embodiment, instead of providing user 114 with the ability to alter the routing rules, the management link simply provides user 114 with the ability to deactivate the alias.

In operation, user 114 can generate an alias as described above, and provide it to a mailing list. The rules associated with the alias, immediately after its creation, allow all mail directed to the address to be routed to a destination address used by user 114. Upon receipt of a mail message in step 208, mail server 102 retrieves the routing rules from list 108, and routes the message to the destination address after appending a management link to the body of the message. After some time has passed, user 114 begins to notice that UCE is arriving through the alias. Whereas with prior art implementations, the determination that UCE is arriving to a particular alias may require the user to view the message header to determine the address that the message was originally intended for, the present invention can provide the user with a management link in the body of the email message that can identify the alias that the UCE was received through. By clicking on the management link, the user is able to change the rules associated with the alias, so that only messages received from the mailing list address will be routed to the destination address.

A rule is put in place that directs any other received messages to a honey pot address. Thus the user is no longer bothered by the incidence of UCE. In another example, an alias is issued through a web server and is directed to a customer service email address. Upon a message addressed to the alias, processing engine 110, directs the message to the customer service email address and decrements the number of accepted messages associated with the alias from 5 to 4. The recipient of the email, determines that the message is not from a customer, but is instead UCE. By clicking on the embedded management link, user 114 is able to delete the alias, so that all future messages directed to the alias are simply discarded, and an autoreply message is issued indicating that the address is no longer valid.

As will be understood by those skilled in the art, the mail server of the present invention preferably includes an outgoing mail processing engine. This engine receives outgoing mail from the email client, preferably using a standard protocol such as SMTP, and replaces the from address in the header with an alias determined in accordance with the message and the destination address. Thus, transparently to the end user, a reply to a message sent to an alias is intercepted and modified so that it appears that it has been sent from the alias address. This prevents the root address from being revealed by a reply. The determination of the alias address to use in the from field can be made based solely on the destination address, or can be made in accordance with other information, preferably stored in the header, that identifies the alias to which the message had been sent.

An embodiment of an email client application agnostic mail server of the present invention is now provided. To allow any email client to respond to messages directed to an alias without providing the non-aliased email address the mail server of the present invention intercepts all messages sent by the email client and rewrites the message header to ensure that only the alias is provided. After an email message is received by the mail server, and processing described above to determine routing rules and conditions is performed. Prior to the transmission of the message to the recipient, the originating address field, commonly referred to as the "to field" is rewritten, so that any reply to the message will be directed back to the mail server. When the user replies to the message the email application will typically provide the non-aliased address. When the user sends the message, it is routed to the mail server, which edits the header, replaces the from address with and alias, and puts a proper destination address in place. As an example, a message is received at the mail server (server.com) from xxx@uce.com addressed to alias@server.com. The mail server determines that the message is to be routed to user@server. The from address of this message is overwritten, so that instead of xxx@uce.com it reads as xxx#uce.com@server.com. When the user replies to the message, it is received by the mail server, and the address xxx#uce.com@server.com is replaced by xxx@uce.com, while the user's address of user@server.com is replaced by alias@server.com One skilled in the art will appreciate that the mail server is effectively serving as an alias server in both directions to prevent user@server.com from being distributed.

Another embodiment of the generation of aliases is now provided. Form filling applications, such as those designed as web browser plugins and toolbars, or provided through identity management systems as links on a form, provide users with the ability to automatically submit information to web based forms. Form fillers typically store identifying information such as first and last names, addresses, phone numbers, and email addresses. In one embodiment of the present invention, the form filling application, be it a web browser add on or a part of an identity management system, includes a component to request an alias from alias generator 100 and provide the generated alias to the web based form. In a presently preferred embodiment, along with the request to generate an alias, the form filler provides the URL of the form in which the information will be entered, so that the alias generator 100 can store the information to later determine if privacy policies have been breached. One skilled in the art will appreciate that the implementation of a web browser add on to fill forms employs the same components as a plug in addition to a web browser. In an identity management system the alias generation request is made to an alias generator 100 whose address is associated with the user profile. Optionally, the user is provided with the option of providing either an alias or a real email address. This choice can be provided by the identity management system through the use of a pop-up web browser window that provides the user the option of selecting an alias or a real email address. The alias generator 100 provides the identity management system with the generated alias the same way that it provides generated aliases to other embodiments of the invention. The identity management system includes an alias generator interface for generating alias requests in response to a received form filling request. The alias generator interface preferably provides alias routing preferences along with the request.

In another embodiment, the alias generator can be operated by the administrator of a mailing list. Thus, when a user signs up for a mailing list a valid e-mail address is provided to the mail list operator. As with all common mailing lists, e-mail from a user to be posted to the list is transmitted to an address provided by the mailing list operator. This message is then relayed to all members of the mailing list who will receive it as a message from the mailing list operator. Typically, mailing lists provide an indication to their members regarding who transmitted the message. In this present embodiment of the invention the e-mail address provided by the mailing list operator to the recipients of the mailing list message would be an alias, administered by the mailing list operator, where all messages transmitted to the alias would be routed to the poster of the message. Thus, though participants in the mailing list provide the mailing list operator with a valid e-mail address the valid e-mail address is never provided to other members on the list, and instead only an alias is provided. The alias provided for each user of the mailing list can either be dynamically created for each transmission, or each user of the mailing list can be assigned an alias that is used by the mailing list until deactivation by the user. The mailing list operator can provide mail server functionality similar to that of mail server 102, wherein all messages transmitted to aliases hosted by the mail server are modified to include an alias management link. When providing an online, web-accessible archive of the mailing list postings the operator can provide aliases using either the aforementioned technique of launching a new window that preferably uses JavaScript™ to enhance the user experience, or if the mailing list archive is provided as a dynamic HTML page, the alias for each message can be dynamically generated upon request of the page, or simply generated when the link is clicked on. This allows the mailing list operator to allow viewers of web based archives a mechanism to contact the poster of a message, without subjecting the user to the possibility of having an e-mail address harvested for placement on a UCE distribution list. One skilled in the art will appreciate that the rules assigned to each generated alias can vary from implementation to implementation, however, it is foreseen that for web based archives, aliases will typically be provided as one off single transmission e-mail addresses.

Thus, the present invention provides a mechanism for alias management, and creation, that allows aliases to be used to prevent receipt of unwanted commercial e-mail. By allowing the generation of aliases by both a browser based plug-in, and an identity management network, users are provided with a simple mechanism of generating aliases on demand. The mail server of the present invention provides a simplified mechanism for a user to modify the alias routing rules by simply clicking on an embedded link in a received e-mail message. This allows the user to delete, reroute, re-enable, or otherwise handle any messages sent to an alias. The message routing employed by the mail server of the present invention preferably employs condition based mail routing, whereas many prior art implementations of mail servers for aliased accounts employed strict rules based routing. That is, a prior art server employed a simple look up table to determine how to map aliases to mail accounts, where the present invention can evaluate conditions to determine the mapping of aliases in addition to the use of simple mapping look ups. Additionally, the mail server of the present invention provides novel management techniques through the insertion of an alias management link in the message.

Alias generator 100, mailing list server and mail server 102 can be implemented using standard computer equipment, connected to a shared data network such as the Internet. One skilled in the art will appreciate that a number of standards exist for the handling of mail in a mail server, and by modifying publicly accessible, or already implemented mail servers, a mail server to implement rule based routing of aliases can easily be implemented. An alias generator can be implemented using standard programming languages and constructs on available computer platforms, and can be implemented by those skilled in the art to communicate with both alias requesters and the mail server using a defined API.

The implementation of the present invention as either a plug-in or as an integral part of an email client will be understood to those skilled in the art to require a connection to alias generator 100. Over the connection the email client or plug in issues an alias generation request. In response to the alias generation request, alias generator 110 generates an alias using techniques such as those illustrated above, and provides the alias to the email client application for insertion into a "from address" field. The email client preferably transmits, along with the request, a set of options that determine the routing rules associated with the alias.

One skilled in the art will appreciate that the system and method of the present invention provide the ability to generate aliases for use as disposable email addresses, so that harvesting scripts cannot effectively gather an email address that directs messages to users. Additionally, the system and method of the present invention provide a simplified mechanism for generating aliases that can be provided to mailing lists. The system of the present invention can be implemented in a number of ways including as software executed by standard personal computer hardware having network connectivity as will be understood by those of skill in the art.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A pseudonymous email address generator comprising:
  a request interface configured to receive a pseudonymous email address generation request, the request being associated with a requester, the request containing identification information including at least an address associated with the requester; and
  a computer-readable storage medium embodying computer-readable instructions that implement a pseudonymous email address creator configured to:
    create a pseudonymous email address associated with a mail server in response to the received pseudonymous email address generation request,
    associate the pseudonymous email address with an email address,
    provide the created pseudonymous email address and its associated email address to the mail server,
    cause the created pseudonymous email address to be provided to the requester; and
    use the address associated with the requester to correlate monitoring for additional pseudonymous email address generation requests to ascertain whether the address associated with the requester is associated with an email address harvesting entity based on said additional pseudonymous email address generation requests having a characteristic similar to a profile established for one or more email address harvesting entities.

2. The generator of claim 1 further comprising a mail server interface configured to receive from the pseudonymous email address creator both the pseudonymous email address and the email address associated with the pseudonymous email address, and provide them to the mail server associated with the pseudonymous email address.

3. The generator of claim 1 further comprising a request analysis engine configured to receive from the request interface an indication of a destination of a requested alias, and determine in accordance with the indication that the email address associated with the pseudonymous email address is a honeypot address.

4. The generator of claim 1 wherein the pseudonymous email address creator further comprises:
  means for defining properties of the pseudonymous email address, the properties selected from a list including a friendly name associated with the pseudonymous email address, a management link and corresponding attachment method, and the email address the pseudonymous email address is associated with; and
  means for providing the defined properties to an associated mail server.

5. The generator of claim 1 further comprising a rules engine configured to:
  define a set of routing rules in accordance with requests received by the request interface,
  associate the defined set of rules with pseudonymous email addresses generated by the pseudonymous email address creator, and
  provide the created set of rules to the mail server associated with the pseudonymous email address.

6. The generator of claim 5 wherein the rules engine further comprises means for defining the routing rules in accordance with a set of parameters defined in the pseudonymous email address generation request.

7. The generator of claim 5 wherein the rules engine further comprises means for defining the routing rules in accordance with a set of default parameters.

8. The generator of claim 7 wherein the default parameters are dependent upon a requester identifier associated with the pseudonymous email address generation request.

9. A computer-implemented method comprising:
    receiving a request for creating a pseudonymous e-mail address, the request being associated with a requester, the request containing at least an address associated with the requester;
    responsive to receiving the request, creating a pseudonymous e-mail address;
    associating the pseudonymous e-mail address with an e-mail address;
    causing communication of the pseudonymous e-mail address to the requester;
    storing the address associated with the requester and the associated pseudonymous e-mail address; and
    using the address associated with the requester to monitor additional incoming requests for creating additional pseudonymous e-mail addresses to ascertain whether the address associated with the requester is associated with an email address harvesting entity based on said additional incoming requests having a characteristic similar to a profile established for one or more email address harvesting entities.

10. The computer-implemented method of claim 9 further comprising, responsive to ascertaining that the address associated with the requester is associated with an email address harvesting entity, modifying routing rules to discard e-mail to the pseudonymous e-mail address.

11. The computer-implemented method of claim 9 further comprising, responsive to ascertaining that the address associated with the requester is associated with an email address harvesting entity, using the pseudonymous e-mail address as a honey pot e-mail address.

12. The computer-implemented method of claim 9, further comprising receiving an indication that a pseudonymous e-mail address provided to a specified address has likely been provided to a email address harvesting entity.

13. The computer-implemented method of claim 12, further comprising responsive to receiving the indication, modifying routing rules to discard e-mail to the pseudonymous e-mail address.

14. The computer-implemented method of claim 12 further comprising responsive to receiving the indication, using the pseudonymous e-mail address as a honey pot e-mail address.

15. The computer-implemented method of claim 9, wherein receiving the request comprises receiving a request from an http server.

16. The computer-implemented method of claim 9, wherein receiving the request comprises receiving a request from a server.

17. The computer-implemented method of claim 9, wherein receiving the request comprises receiving a request from a user.

18. The computer-implemented method of claim 9, wherein the creating a pseudonymous e-mail address is performed automatically and without input from a user as to content of the pseudonymous e-mail address.

19. The computer-implemented method of claim 9, wherein the creating a pseudonymous e-mail address is performed automatically responsive to a click on a contact link.

20. An article of manufacture including a computer-readable storage medium having instructions stored thereon that, responsive to execution by a computing device, cause the computing device to perform operations comprising:
    receiving a request for creating a pseudonymous e-mail address, the request being associated with a requester, the request containing at least an address associated with the requester;
    responsive to receiving the request, creating a pseudonymous e-mail address;
    associating the pseudonymous e-mail address with an e-mail address;
    causing communication of the pseudonymous e-mail address to the requester;
    storing the address associated with the requester with the associated pseudonymous e-mail address; and
    using the address associated with the requester to monitor additional incoming requests for pseudonymous e-mail addresses to ascertain whether the address associated with the requester is associated with an email address harvesting entity based on said additional incoming requests having a characteristic similar to a profile established for one or more email address harvesting entities.

21. The article of manufacture including the computer-readable storage medium of claim 20 further comprising computer-executable instructions stored thereon that, responsive to execution by the computing device, cause the computing device to perform operations further comprising responsive to ascertaining that the address associated with the requester is associated with an email address harvesting entity, modifying routing rules to discard e-mail to the pseudonymous e-mail address.

22. The article of manufacture including the computer-readable storage medium of claim 20 further comprising computer-executable instructions stored thereon that, responsive to execution by the computing device, cause the computing device to perform operations further comprising, responsive to ascertaining that the address associated with the requester is associated with an email address harvesting entity, using the pseudonymous e-mail address as a honey pot e-mail address.

23. The article of manufacture including the computer-readable storage medium of claim 20 further comprising computer-executable instructions stored thereon that, responsive to execution by the computing device, cause the computing device to perform operations further comprising receiving an indication that a pseudonymous e-mail address provided to a specified address has likely been provided to a email address harvesting entity.

24. The article of manufacture including the computer-readable storage medium of claim 23 further comprising computer-executable instructions stored thereon that, responsive to execution by the computing device, cause the computing device to perform operations further comprising responsive to receiving the indication, modifying routing rules to discard e-mail to the pseudonymous e-mail address.

25. The article of manufacture including the computer-readable storage medium of claim 23 further comprising computer-executable instructions stored thereon that, responsive to execution by the computing device, cause the computing device to perform operations further comprising responsive to receiving the indication, using the pseudonymous e-mail address as a honey pot e-mail address.

26. The article of manufacture of claim 20, wherein receiving the request comprises receiving a request from an http server.

27. The article of manufacture of claim 20, wherein receiving the request comprises receiving a request from a server.

28. The article of manufacture of claim 20, wherein receiving the request comprises receiving a request from a user.

29. The article of manufacture of claim 20, wherein the creating a pseudonymous e-mail address is performed automatically and without input from a user as to content of the pseudonymous e-mail address.

30. The article of manufacture of claim 20, wherein the creating a pseudonymous e-mail address is performed automatically responsive to a click on a contact link.

31. A system comprising:
   means for receiving a request for creating a pseudonymous e-mail address, the request being associated with a requester, the request containing at least an address associated with the requester;
   means for responsive to receiving the request, creating a pseudonymous e-mail address;
   means for associating the pseudonymous e-mail address with an e-mail address; means for causing communication of the pseudonymous e-mail address to the requester;
   means for storing the address associated with the requester with the associated pseudonymous e-mail address; and
   means for using the address associated with the requester to monitor additional incoming requests for pseudonymous e-mail addresses to ascertain whether the address associated with the requester is associated with an email address harvesting entity based on said additional incoming requests having a characteristic similar to a profile established for one or more email address harvesting entities.

* * * * *